United States Patent [11] 3,528,425

| [72] | Inventor | Anton Banko<br>Brooklyn, New York |
|---|---|---|
| [21] | Appl. No. | 762,286 |
| [22] | Filed | Sept. 16, 1968 |
| [45] | Patented | Sept. 15, 1970 |
| [73] | Assignee | Surgical Design Corporation<br>Long Island City, New York<br>a corporation of New York |

[54] APPARATUS FOR PERFORMING SURGICAL PROCEDURES ON THE EYE
12 Claims, 14 Drawing Figs.

[52] U.S. Cl. .................................................. 128/305,
128/329
[51] Int. Cl. ............................................... A61f 9/00,
A61n 3/00, A61b 17/32

[50] Field of Search ........................................ 128/24.05,
303, 303.1, 305, 329, 333

[56] References Cited
UNITED STATES PATENTS

| 2,249,906 | 7/1941 | Longoria ..................... | 128/305 |
| 2,419,045 | 4/1947 | Whittaker .................... | 128/305 |
| 2,873,742 | 2/1959 | Shelden ....................... | 128/305 |
| 3,159,161 | 12/1964 | Ness ............................. | 128/350 |

*Primary Examiner*—Richard A. Gaudet
*Assistant Examiner*—Channing L. Pace
*Attorney*—Leonard W. Suroff ABSTRACT: The method and apparatus of the invention relate to performing surgical procedures on the eye in vivo, including forming of an opening therein to permit the insertion of instrumentation within the eye for various procedures.

INVENTOR.
ANTON BANKO
BY
Leonard U. Turoff
ATTORNEY

Patented Sept. 15, 1970

INVENTOR.
ANTON BANKO

BY
Leonard U. Suroff
ATTORNEY

Patented Sept. 15, 1970
3,528,425
Sheet 3 of 3
FIG.6
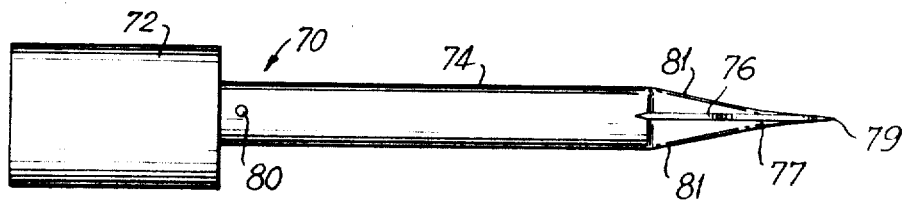
FIG.7
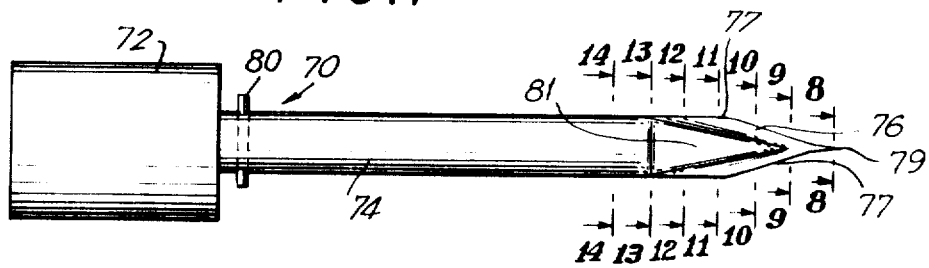
FIG.8
FIG.9
FIG.10
FIG.11

INVENTOR.
ANTON BANKO
BY Leonard W. Suroff
ATTORNEY

APPARATUS FOR PERFORMING SURGICAL PROCEDURES ON THE EYE

CROSS-REFERENCE TO RELATED APPLICATION

In applicant's copending application Ser. No. 760,003 filed on September 16, 1968, and which entire subject matter of the copending application is incorporated herein by reference as if fully set forth herein, applicant discloses the method and apparatus for performing retina reattachment procedures using ultrasonic energy in which the opening in the eye may be formed in accordance with the teachings of the present invention.

BACKGROUND OF THE INVENTION

The present invention relates generally to improvements in surgical procedures related to the eye, and more particularly for forming an opening in the eye to permit the insertion of instrumentation therein.

The outstanding and unexpected results obtained by the practice of the method and apparatus of the present invention, are attained by a series of features, steps and elements, working together in inter-related combination, and may be applied to biological organisms in general and particularly humans, and hence will be so illustrated and described.

Applicant has found that in order to perform various exploratory, diagnostic, or other surgical procedures with respect to the eye, that it is necessary for an incision or opening to be formed through the wall thereof such that the instrumentation necessary might be inserted therethrough. When the procedure intended is completed it then becomes necessary to close the opening and permit the incision in the wall of the eye to properly heal such that the eye might function in a proper manner. In applicant's copending patent application referred to above, the process of retina reattachment is disclosed, and in which an incision might be formed in accordance with the present invention. To facilitate the discussion of applicant's invention dealing with the formation of the incision reference is made to the copending application to merely illustrate one form of surgical procedure that might be conducted after the opening is made as hereinafter described in detail.

By way of illustration and not limitation, once the incision has been made in accordance with the present invention and a passageway formed from the interior to the exterior of the eye then a variety of instruments besides an ultrasonic probe, may be inserted within the passageway to accomplish physical tasks or transmit information to the trained individual from within the eye. For example, a two way bundle of fibers, of which one set is used for the illumination of the interior of the eye and the other set in the bundle is used to carry the image back to the viewer may be utilized. This permits a thorough inspection of the interior of the eye before and after any operation is performed. An instrument may be inserted through the passageway for removing blood clots and other impurities from vitreous material contained within the eye. Instrumentation may also be utilized for replacement of lost or spoiled vitreous material. An instrument may be utilized for cutting membranes and bands tracting the retina. An instrument may also be utilized to force the subretinal fluid (vitreous) into the eye, and the retina to settle back against the choroid. An ultrasonic or other cautery for sealing retinal vessels causing hemorrhage into the vitreous or aqueous of the eye may also be used. Essentially, in all of these related illustrated procedures it is necessary that a proper sclerotomy be formed such that after the necessary time is required for carrying out the procedure the incision may be closed to permit a proper healing thereof.

Before proceeding to the details of the invention, let us first review briefly generally known facts of the eye, and the anatomy of the retina. The retina of the eye is attached to the underlying choroid at the optic nerve border posteriorly and at the ora serrata anteriorly. Between these two points it is in contact with but not attached to the choroid. The retina covers the entire inner aspect of the eyeball posterior to the ora serrata. The ora serrata is the junction of the retina and the ciliary body, in the average eye it is about 8 mm posterior to the limbus. The retina is composed of inelastic nerve tissue, consisting of ten distinct different layers, normally it is transparent, when detached it appears gray. Most common of retina detachment is the partial separation (detachment) of the retina from the choroid. The superior temporal part of the retina is most commonly affected, but any part or even the entire retina may become detached. According to this invention before the reattachment of the retina may take place an opening must be formed permitting the insertion of the required instrumentation.

OBJECTIVES OF THE INVENTION

An object of the present invention is to provide an improved method and apparatus for performing surgical procedures with respect to the eye.

Another object of the present invention is to provide an improved method and apparatus for forming an incision with respect to the wall of the eye.

Another object of the present invention is to provide an improved method and apparatus to form an incision in the wall of the eye that permits the introduction into the eye of a variety of instrumentations that may be used for both exploratory, diagnostic and surgical procedures.

Another object of the present invention is to provide an improved method and apparatus for opening the eye and subsequently introducing instrumentation therein and maintaining the instrumentation in sealing engagement so as to prevent the loss of vitreous material therefrom.

Other objects and advantages of this invention will become apparent as the disclosure proceeds.

SUMMARY OF THE INVENTION

The present invention is directed to the formation of an opening in the eye such that a passageway is formed through which various instruments may be inserted within the eye to perform exploratory or surgical procedures which may be of a diagnostic or therapeutic nature. The sclerotomy or opening that is formed is based on the fact that it is possible with specially designed cutting means and supporting means, assembled together, to insert them through the wall of the eye such that an opening is formed. The cutting element is designed to puncture the wall, which is composed of a number of layers, when a static force is applied thereto. The supporting means has retaining means associated therewith such that in its seated position through the wall it is in interlocking relationship with the wall such that the cutting element may then be disassembled from the supporting means and retracted. The supporting means has a passageway extending therethrough which permits the insertion of various tools and instruments into the eye. The supporting means is provided with one or two conventionally applied sutures such that it is retained in sealing engagement with the wall to prevent any leakage therethrough. The passageway may contain therein sealing means in the form of an o-ring which is capable of preventing any of the material from flowing thereout as an instrument is inserted therein.

The cutting element is designed to have a conically pointed puncturing surface having spaced apart cutting edges such that it has the ability to sever and separate the adjacent wall portions as it is forced through the wall thereof. The cutting element acts as a two edged knife designed to start an incision and enlarge it to the proper length which thereafter continues until the supporting means reaches its seated position and held fast by the retaining means associated with the supporting means.

In practicing the invention, after the completion of the necessary procedure, the supporting means may be removed by first inserting a removing means that may be interlocked with the supporting means and after the sutures are loosened it may be removed by applying a static force outwardly directed from the eye to disengage the retaining means. The removing means also acts to increase the pressure in the eye thus reducing the clamping force around the supporting means, facilitating its removal. The sutures need only be loosened and as the supporting means is retracted they may be progressively tightened to continuously close the adjacent edges of the incision keeping the eye wall in sealed engagement with the outgoing removing means.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 6, is a side plan view of the cutting means used to form the opening in the eye;

FIG. 7 is a top view of the cutting means illustrated in FIG. 6; and

FIGS. 8—14, are cross-sectional views taken along the respective section lines in FIG. 7.

DETAILED DISCUSSION OF THE DRAWINGS

Figure 1:
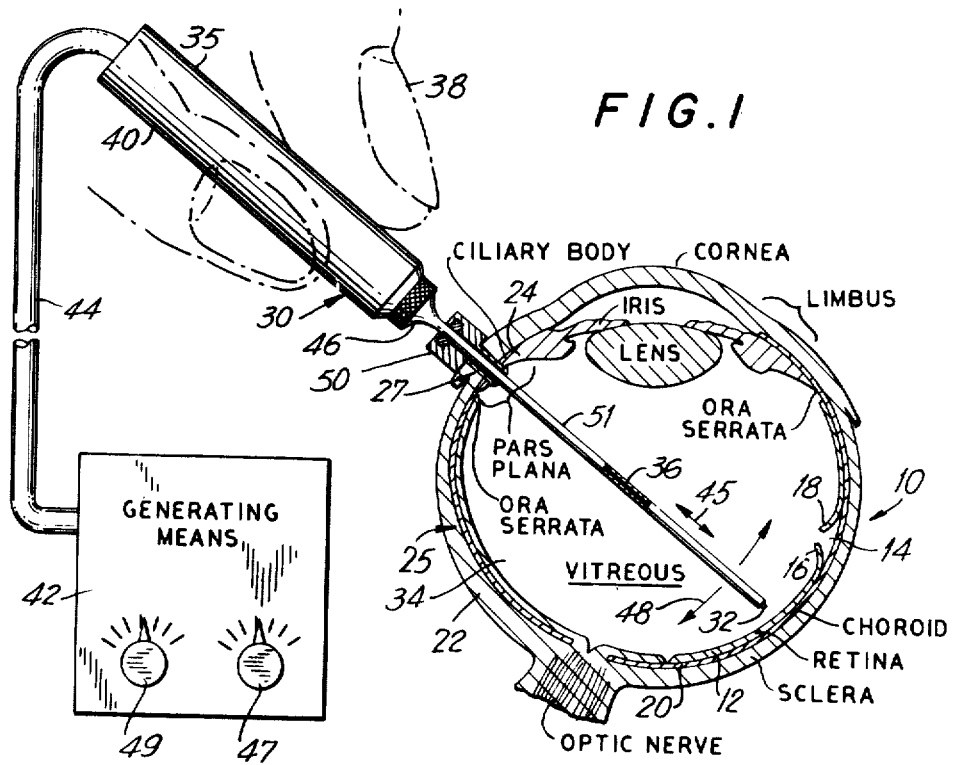
FIG. 1, is a somewhat schematic view of an ultrasonic motor generator system for driving a tool member inserted in the eye through an opening formed in accordance with the present invention.

Referring now to the drawings and particularly to FIG. 1 thereof, we see the schematic representation of an eye 10 having the various portions thereof including a retina 12, in a particular area 14 with spaced apart detached portions 16 and 18 from the choroid 20. The area 14 is detectable in a conventional manner such that the surgeon is aware of its location and will conduct the operation with the intent to rejoin the detached portions, or portion, to the choroid 20 without substantially, if at all injuring the associated parts thereof including the sclera 22. The wall 25 is intended to define any portion of the eye which when pierced will connect the interior of the eye to the exterior and will generally include all, or portions, of the retina 12, choroid 20 and sclera 22, or the sclera 22 and ciliary body 24.

Once the partial separation, or detachment of the retina 12 from the choroid 20 is detected, and this generally occurs with respect to the superior temporal part of the retina which is most commonly affected, but any part or even the entire retina may become detached, then the reattachement of the retina is accomplished in accordance with the teachings of applicant's copending patent application. Briefly this includes first forming an incision or opening 27 in the eye 10, in accordance with the present invention, to permit the insertion of instrumentation in the form of a probe 30 therethrough to reach the specific area to be treated. The opening 27, as hereinafter described in greater detail, is capable of being used not only for the reattachment of the retina but for various other operative procedures and uses hereinabove disclosed, both with the eye and other portions of the anatomy and is accordingly so described and intended.

Once the opening 27 is formed the probe 30, or other instrumentation, is inserted therein such that the tip or distal end 32 thereof, which is the vibratory surface, is positioned within the vitreous material 34 contained in the eye 10 and the vibrational wave energy may be propagated through the vitreous material 34 to obtain a joining or a bonding of the detached portions 16 and 18 to the wall 25, such as the choroid 20 and the sclera 22. The vibrational wave energy or ultrasonic energy as the terms are herein used, is intended to include vibratory energy in the frequency range of from 1,000 cycles per second to 20 million cycles per second although the preferable range is generally from 10,000 cycles per second to 1 million cycles per second.

Referring further to FIG. 1, it will be seen that the instrumentation in the form of probe 30 for ultrasonically performing surgical procedures on a biological organism, such as a human, may include an ultrasonic transducer or motor 35 for effecting the necessary high frequency vibrations of the vibratory element or tool member 36 with the distal end or output surface 32 transmitting the vibrations. The ultrasonic motor 35, as illustrated may be in the form of a driving member adapted for being hand held as by an operator 38, and generally comprising a tubular housing or casing 40 into which an insert unit supporting the vibratory element 36 may be partially telescoped. The ultrasonic motor 35 is energized by an oscillation generator 42, with a power cable 44, connecting the two together. The generator is an oscillator adapted to produce electrical energy having ultrasonic frequency.

The ultrasonic motor 35 may be one of a variety of electromechanical types, such as electrodynamic, piezoelectric or magnetostrictive. The ultrasonic motor for effecting surgical procedures through hand directed tools of suitable configuration, may be of the type which are readily replaceable or interchangeable with other work performing tools in acoustically vibrated material treating devices, and each work tool member is rigidly joined, in end-to-end relationship to a connecting body or acoustic impedance transformer and to a transducer which may form an insert unit or assembly which is removably supported in a housing containing a coil in surrounding relationship to the transducer and receiving alternating current for producing an alternating electromagnetic field.

The transducer in the ultrasonic motor 35 is longitudinally dimensioned so as to have lengths which are whole multiples of half wavelengths of the compressional waves established therein at the frequency of the biassed alternating current supplied so that longitudinal loops of motion as indicated by arrow 45, occur with maximum displacement at the distal end 32 of the vibratory element 36 that is rigidly connected to the insert unit. Thus, the optimum amplitude of longitudinal vibration and hyper-accelerations of vibratory element 36 is achieved, and such amplitude is determined by the relationship of the masses on both sides of the nodal region of the vibratory element which may be made effective to either magnify or reduce the amplitude of the vibrations received from the transducer.

The generator 42 is provided with a control means, for setting the time of duration of the energy by adjusting the dial 47. For power adjustment dial 49 is provided which controls the amount of power delivered to the ultrasonic motor. The vibratory stroke of the output surface 32 of the vibratory element 36 is controlled by manual setting of the power dial 49 on the generator.

The vibratory probe 30 is provided with guard means 46 that may be secured to the casing 40 of the motor 35 in any conventional manner and which may be in the form of a tubular member 51 mounted in coaxial alignment with the vibratory element 36 and designed to provide clearance around the vibrating surface in order to prevent rubbing between the vibratory element and the housing when the tip is vibrating, thus, preventing generation of heat due to friction. The protective tubing 51 also serves as an insulator or as a reflector to prevent ultrasonic energy being radiated except from the output surface 32. The protective tubing 51 may extend the length of the vibratory element 36 or beyond it if desired and also serves to support the front part of the ultrasonic probe 30.

Having thus briefly described one form of instrumentation 30 that may be utilized to perform operative procedures on the eye, it is seen that an opening 27 is first required to be formed on the wall 25 of the eye 10, which may be over the pars plana, and that as illustrated in FIG. 1, supporting means 50 be provided to extend through the opening 27 to lend support to the instrumentation 30 extending therethrough. As seen with respect to FIGS. 2–5, the opening 27 extends through the sclera 22 and ciliary body 24 over the most convenient region of the pars plana.

The supporting means 50, which may be of a metallic or thermoplastic material, as seen with respect to FIGS. 2—5, extends through the wall 25 and is positioned in and tightened in the incision or opening 27 by a double mattress suture 52. The support means 50 should have the ability to rotate within the opening 27. To provide a seal with the protective tubing 51 and facilitate its sliding, the supporting member 50 should have a minimum outside diameter to be inserted into the incision 27, and possibly supported and rotated by a micromanipulator. Finally the supporting member 50 should eventually provide for an increase in volume of the vitreous cavity in order to reduce the pressure in the eye 10, during the operation. The supporting means 50 comprises a tubular body portion 53 which may be of circular cross-sectional area so that it may be rotatable after it is seated through the wall 25 of the eye 10 and includes a passageway 54 connecting the interior of the eye to the exterior, and extending from the front end 56 to the rear end 58, which rear end has an upper annular flange 60 extending radially outwardly from the body portion 53 proximate the upper end thereof and adapted to overlap the outer surface of the eye 10. A lower annular flange 62 is provided extending radially outwardly from the body portion 53 proximate the lower end thereof and adapted to extend over the inner surface of the wall portion 25. The spacing between the flanges forming retaining means 63 in the form of a groove 64, which as illustrated is adapted to retain the wall portion 25 of the eye 10 in fixed position.

The passageway 54 should be of sufficient volume for retreat of the vitreous material from the tense eye without the possibility of it running out and being lost. Sealing means 65 is provided in the passageway 54 to prevent any of the internal fluids of the eye from flowing out when the instrument 30 extends through the passageway 54. The sealing means 65 may include a seat or groove 66 containing a sealing member 68, which may be in the form of an o-ring to provide the sealing engagement with any element inserted within the passageway 54. Due to the viscosity of the vitreous material a close tolerance at one point in the passageway 54 with the protective tubing 51, or other instrument, may be sufficient to provide the sealing engagement.

The supporting means 50 has mounted coaxially therewith cutting means in the form of cutting element 70 which includes an enlarged head section 72, adapted to be coupled to an instrument if desired, and having a base section 74 extending through the passageway 54 and terminating in a cutting surface 76 of a selected configuration. Locking means 78 is provided between the supporting means 50 and cutting means 70 to releasably connect them together and permit the removal of the cutting means 70 after the supporting means 50 has penetrated the wall 25 and is held in place by the retaining means 63. The locking means 78 may be in the form of a pin 80 extending from the base section 74 into a cooperating groove 82 contained within the passageway 54 to prevent angular rotation between said respective means during their insertion into the eye in the direction of arrow 84.

Figure 14:
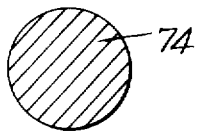

The cutting means 70, which may be of a metallic material, is illustrated in greater detail in FIGS. 6—14, and is seen to include the head section 72 that may be integrally formed with the base section 74 terminating in a cutting surface 76 including spaced apart cutting edges 77, approximately 180° apart, that are joined at one end at the pointed tip 79 and progressively taper outwardly therefrom until merging in the base section 74 having a circular cross-section as seen in FIG. 14. The forward end of the base section 74 terminates in a conically tapered section 81 that blends with the cutting edges 77. Although two cutting edges 77 have been shown on a common plane, one, or more than two, cutting edges may also be used, and spaced apart in any selective pattern. The cutting edges 77 are contained on the base section 74 beyond the supporting means 50 such that the cutting surface 76 will first penetrate the wall 25 to form the opening 27 for receiving the supporting means 50 in seated position within the opening.

Figure 2:
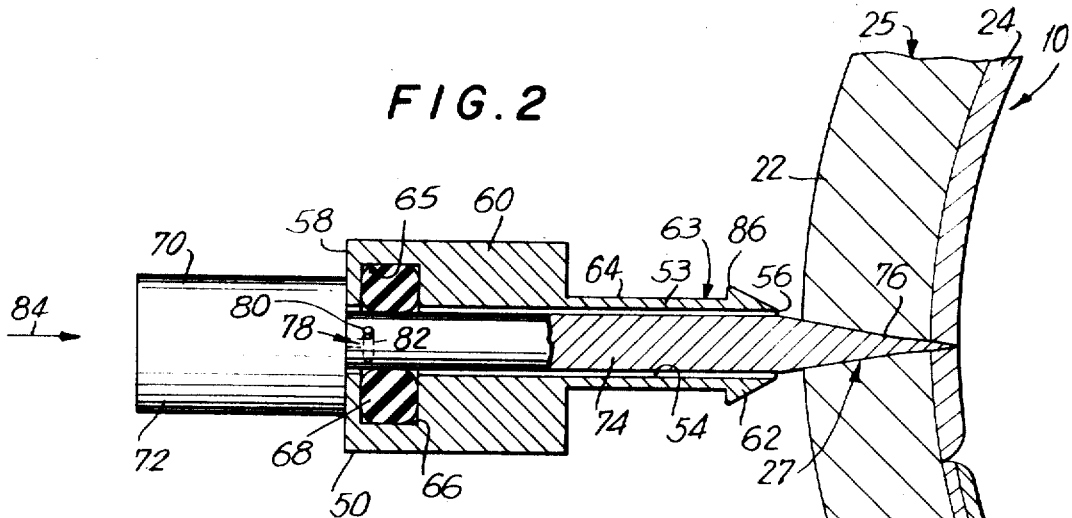
FIGS. 2 and 3, are greatly enlarged views, partly in section, illustrating the formation of an opening through the wall of the eye.
Figure 3:
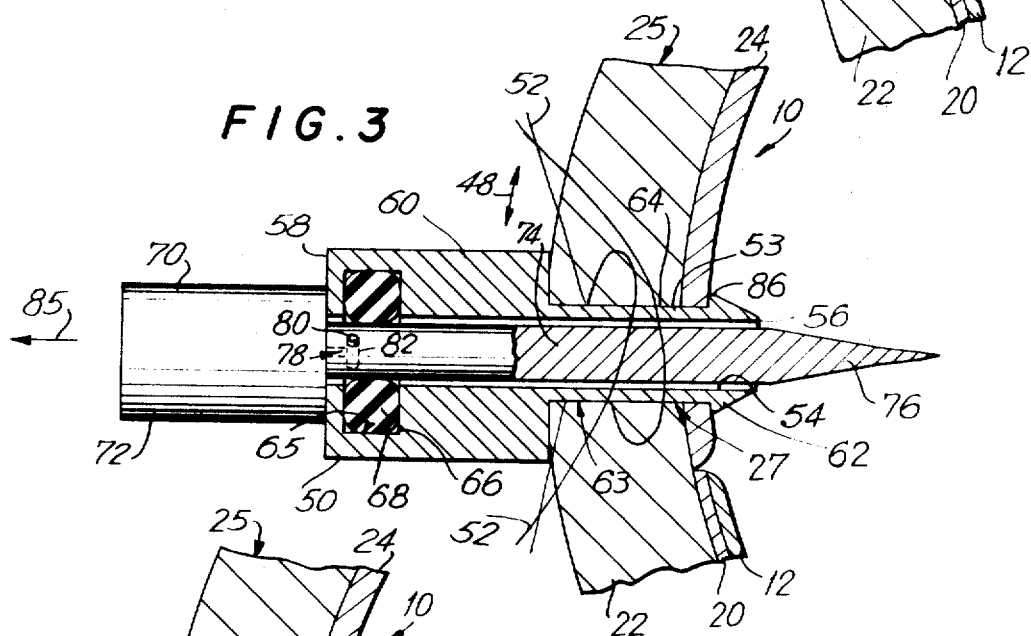

In actual practice the combined supporting means 50 and cutting means 70 are releasably coupled together as a unit and inserted in the direction of arrow 84 as seen in FIG. 2, such that the cutting surface 76 first pierces the wall 25 and is moved axially forward until the position in FIG. 3 is reached with the supporting means 50 positioned in the opening 27 that is formed by the cutting surface 76. The contour of the cutting surface 76 being pressed into the eye 10 is of increasing cross-section and designed as a conical shape until it embraces the groove 64 of the supporting means 50. The lower flange 62 has a rounded edge 86 and tapered front such as to continue essentially the taper of the cutting surface 76, as it is forced through the wall 25. Once the position in FIG. 3, is reached the wall 25 extends within the groove 64 thereby retaining the supporting means 50 in fixed position against axial movement and the two mattress sutures 52 may be conveniently tightened in surrounding relation so as to prevent any of the vitreous material from flowing out and providing sealing engagement between the supporting means 50 and wall 25.

The cutting element 70 can now be withdrawn, by disengaging or unlocking the locking means 78 and removing the cutting element 70 in the direction of arrow 85, leaving the passageway 54 open and in which case part of the vitreous material will tend to flow therein. It is now possible to insert through the passageway 54 different tools and instruments 30 which normally could be attached to a solid structure like a micromanipulator, which will provide the stability and a supporting point for the front of the instrument, thus relieving the strain on the surgeon's hand.

Figure 5:
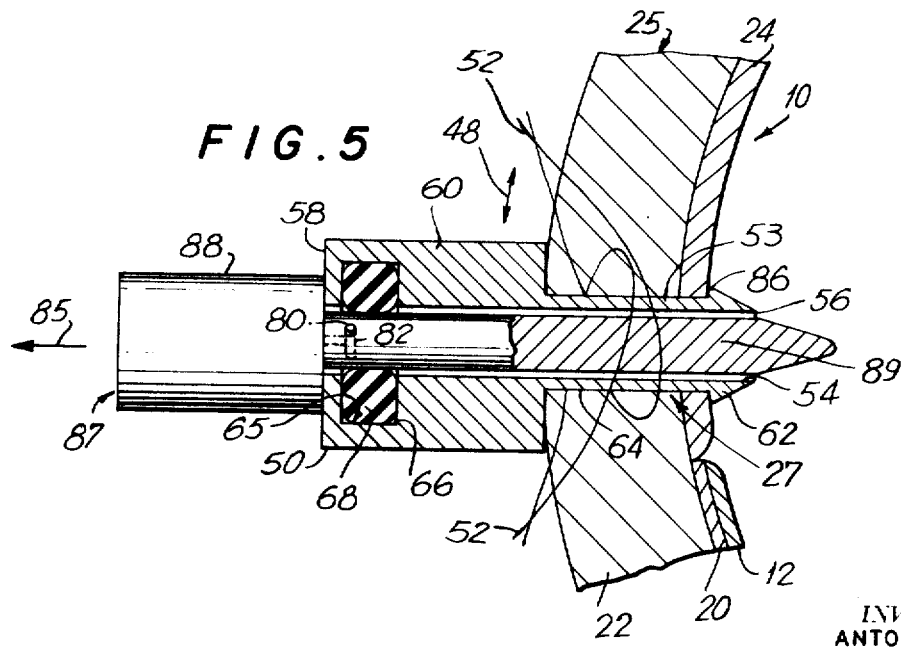
FIG. 5, is a view similar to FIG. 3, showing the removal of the supporting means from within the opening to permit its closing.

Removal of the supporting sleeve, when required, is accomplished, as seen in FIG. 5, by inserting removing means 87 which may include an enlarged rear section 88 that may be gripped by a surgical device, and a front section 89 adapted to extend within the passageway 54 with a tapered front end, to minimize damage on the eye tissue during the withdrawal of the supporting means 50 by providing a smooth and gentle removal. During this latter process, an additional of the same pair of mattress sutures 52 are to be gradually tightened as the supporting means 50 and removing means 87 are gradually removed from the wall 25 to close up the opening 27. The locking means 78 is used to retain the removing means 87 and supporting means 50 coupled together during their removal from the wall.

As discussed above the puncturing or cutting element 70 is a pointed two edged knife, designed to start an incision and enlarge it to the proper length in the desired direction, the direction is defined by the positioning pin 80 contained thereon. An advantage of reinserting of a conically pointed rod into the passageway 54 before the removal of the supporting member 50 is that it forces the vitreous material from the passageway 54 back within to the eye. Insertion of the rod into the eye increases the pressure in the eye, thus reducing the clamping force around the supporting member, facilitating its removal.

Figure 4:
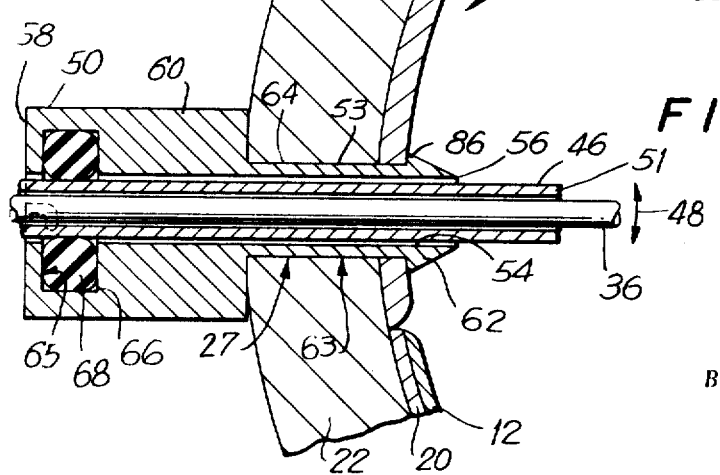
FIG. 4, is a view similar to FIG. 3, showing an instrument extending through the opening into the eye for performing various procedures.
Figure 12:
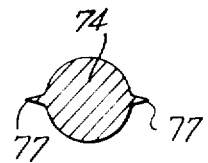
Figure 13:
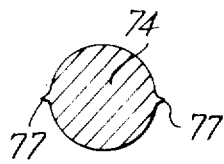

Accordingly, once the supporting member 50 is in place, as seen in FIG. 4, guard means 46 is in sealing engagement with the o-ring 68 and the vibratory element 36 extends therethrough and as seen by the arrow 48 the support member may be angularly tilted such that the distal end thereof may be properly manipulated to the desired position for propagating the energy waves.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

I claim:

1. Apparatus for forming an opening in the wall of the eye to permit the insertion of instrumentation therein, comprising:
   A. cutting means having a cutting surface adapted to penetrate the wall of said eye;
   B. supporting means having a passageway extending therethrough communicating with the interior and exterior of the eye when said supporting means is in its seated position through the wall of the eye;
   C. locking means releasably connecting said cutting means to said supporting means; and
   D. said cutting means extending within said passageway with said cutting surface extending beyond the front of said supporting means, such that when said assembled supporting means and cutting means are forced through the wall of the eye said cutting surface will first penetrate the wall to form the opening for receiving said supporting means in seated position within the opening, and said cutting means is adapted to be removed from said passageway by releasing said locking means such that instrumentation may be inserted through said passageway to gain access to the interior of the eye.

2. Apparatus for forming an opening as defined in claim 1, wherein said instrumentation extending through said passageway is relatively movable in an axial direction with respect to said supporting means so as to obtain selective positioning of the instrumentation within the eye.

3. Apparatus for forming an opening as defined in claim 1, and further including retaining means associated with said supporting means for fixedly retaining said supporting means against axial displacement relative to the wall in said seated position.

4. Apparatus for forming an opening as defined in claim 3, wherein:
   a. said supporting means includes a body portion with said passageway extending axially therethrough; and
   b. said retaining means includes an axially extending groove on the outer surface of said body portion into which said wall extends when the supporting means is in its seated position.

5. Apparatus for forming an opening as defined in claim 4, wherein said body portion includes:
   a. an upper flange extending radially outwardly from said body portion proximate the upper end thereof and adapted to extend over the outer surface of the wall of the eye; and
   b. a lower flange extending radially outwardly from said body portion proximate the lower end thereof and adapted to extend over the inner surface of the wall of the eye, the spacing between said flanges defining the axial length of said groove.

6. Apparatus for forming an opening as defined in claim 5, wherein the length of said groove is substantially equal to the wall thickness of the eye.

7. Apparatus for forming an opening as defined in claim 1, wherein said cutting means includes:
   a. a base section positioned within said passageway and extending beyond said supporting means; and
   b. said cutting surface formed on said extending base section and including at least two spaced apart cutting edges merging at one end of said base section and progressively tapering outwardly therefrom until merging in said base section.

8. Apparatus for forming an opening as defined in claim 7, wherein said cutting edges extend along a common plane.

9. Apparatus for forming an opening as defined in claim 7, wherein said base section is of a circular configuration.

10. Apparatus for forming an opening as defined in claim 1, wherein said locking means includes a pin outwardly extending from said cutting means adapted to be received in a cooperating groove extending within said passageway.

11. Apparatus for forming an opening as defined in claim 1, and further including sealing means contained in said passageway for sealing said supporting means to said cutting means so that when said wall is pierced the vitreous material contained within the eye does not escape through said passageway.

12. Apparatus for forming an opening in the wall of the eye to permit the insertion of instrumentation therein, comprising:
   A. cutting means having a cutting surface adapted to penetrate the wall of said eye;
   B. supporting means having a body portion with a passageway extending axially therethrough for communicating with the interior and exterior of the eye when said supporting means is in its seated position through the wall of the eye;
   C. locking means releasably connecting said cutting means to said supporting means;
   D. said cutting means extending within said passageway with said cutting surface extending beyond the front of said supporting means, such that when said assembled supporting means and cutting means are forced through the wall of the eye said cutting surface will first penetrate the wall to form the opening for receiving said supporting means in seated position within the opening, and said cutting means is adapted to be removed from said passageway by releasing said locking means such that instrumentation may be inserted through said passageway to gain access to the interior of the eye;
   E. retaining means associated with said supporting means for fixedly retaining said supporting means in said seated position against axial displacement relative to the wall said retaining means including an axially extending groove on the outer surface of said body portion into which said wall extends; and
   F. sealing means contained in said passageway for sealing the instrumentation therein to prevent the vitreous material from escaping through said passageway.